US008698770B2

(12) United States Patent
Chen

(10) Patent No.: US 8,698,770 B2
(45) Date of Patent: Apr. 15, 2014

(54) ACTIVE TOUCH SYSTEM

(75) Inventor: Qiliang Chen, Guangdong (CN)

(73) Assignee: Solution Depot (Shenzhen) Limited, Shenzhen (CN)

( * ) Notice: Subject to any disclaimer, the term of this patent is extended or adjusted under 35 U.S.C. 154(b) by 162 days.

(21) Appl. No.: 13/348,250

(22) Filed: Jan. 11, 2012

(65) Prior Publication Data

US 2012/0113038 A1     May 10, 2012

Related U.S. Application Data

(63) Continuation of application No. PCT/CN2009/075970, filed on Dec. 24, 2009.

(30) Foreign Application Priority Data

Aug. 12, 2009  (CN) .......................... 2009 1 0166203

(51) Int. Cl.
*G06F 3/041*    (2006.01)
(52) U.S. Cl.
USPC .............................. 345/173; 345/174; 345/179
(58) Field of Classification Search
None
See application file for complete search history.

(56) References Cited

U.S. PATENT DOCUMENTS

| | | | | |
|---|---|---|---|---|
| 5,854,881 A * | 12/1998 | Yoshida et al. | ............... | 345/104 |
| 5,940,064 A * | 8/1999 | Kai et al. | ....................... | 345/173 |
| 6,239,788 B1 * | 5/2001 | Nohno et al. | ................. | 345/173 |
| 2006/0262100 A1 * | 11/2006 | Van Berkel | .................... | 345/173 |
| 2011/0115733 A1 * | 5/2011 | Shih | ............................... | 345/173 |
| 2011/0128253 A1 * | 6/2011 | Yoon et al. | .................... | 345/174 |
| 2012/0162134 A1 * | 6/2012 | Chen et al. | .................... | 345/174 |
| 2012/0249444 A1 * | 10/2012 | Lee et al. | ..................... | 345/173 |

FOREIGN PATENT DOCUMENTS

| CN | 101118470 | 2/2008 |
|---|---|---|
| CN | 201131618 | 2/2008 |

* cited by examiner

*Primary Examiner* — Van Chow
(74) *Attorney, Agent, or Firm* — Hamre, Schumann, Mueller & Larson, P.C.

(57) ABSTRACT

An active touch system is provided, in which sensing electroding units in an array and two groups of intersecting control electrodes and detecting lines are disposed on a touch substrate, and the detecting lines are connected to sensing electrodings through active devices. The control electrodes are used to control on and off of the active devices, and the detecting lines are used to apply touch excitation signals to the sensing electrodings, and detect a leakage current of a sensing electroding to a finger or other touch object. A position of the finger or other touch object on the touch substrate is found by determining a sensing electroding unit generating the leakage current. The method of obtaining touch signals is improved in the hardware sensing stage, so that the judgment procedure after detection is greatly simplified, and the judgment of multi-point touch becomes easy and natural.

15 Claims, 8 Drawing Sheets

ACTIVE TOUCH SYSTEM

BACKGROUND OF THE INVENTION

1. Field of the Invention

The present invention relates to a touch screen, and more particularly to an active touch screen and a driving circuit thereof.

2. Related Art

Touch is the most important sensory perception of human beings, and is the most natural way in human-machine interaction. The touch screen thus emerges and has already been widely applied in personal computers, smart phones, public information, intelligent household appliances, industrial control, and other fields. In the current touch field, the resistive touch screen, photoelectric touch screen, ultrasonic touch screen, and planar capacitive touch screen are mainly developed, and in recently years, the projected capacitive touch screen is developed rapidly.

So far, the resistive touch screen is still the mainstream product in the market. However, due to the double-layer substrate structure of the resistive touch screen, when the touch screen and the display panel are laminated in use, the reflection of the touch screen may greatly affect the display performance such as brightness, contrast, and chroma, thus greatly degrading the display quality, and the increase of the backlight brightness of the display panel may cause higher power consumption. The analog resistive touch screen has the problem of positioning drift, and needs calibration from time to time. In addition, the electrode contact working mode of the resistive touch screen also reduces the service life of the touch screen.

The display quality of the infrared touch screen and the ultrasonic touch screen is not affected. However, the cost of the infrared touch screen and the ultrasonic touch screen is high, and the water drop and dust may impair the working reliability of the touch screen. Particularly, due to their complicated structures and high power consumption, the infrared touch screen and the ultrasonic touch screen generally cannot be applied in portable products.

The planar capacitive touch screen has a single-layer substrate structure, and thus when the touch screen and the display panel are laminated in use, the touch screen only has a small impact on the display quality. However, the planar capacitive touch screen also has the problem of positioning drift, and needs calibration from time to time. The water drop may also impair the working reliability of the touch screen. Particularly, due to its high power consumption and cost, the planar capacitive touch screen generally cannot be applied in portable products.

The projected capacitive touch screen may also have a single-layer substrate structure, and thus when the touch screen and the display panel are laminated in use, the touch screen only has a small impact on the display quality. However, the projected capacitive touch screen detects the position of the finger or other touch objects on the touch screen by measuring the influence of the finger or other touch objects on the coupling capacitance between the electrodes of the touch screen, that is, by measuring the influence of the finger or other touch objects on the charging/discharging of the electrodes of the touch screen. The positioning point is obtained through analog computation, and thus the projected capacitive touch screen is not a real digital touch screen. The distributed capacitance in the manufacturing and use environment may affect the working reliability of the touch screen, and the interference of the display driving signal and other electrical signals may influence the working of the touch screen, and the water drop may also impair the working reliability of the touch screen. In addition, the projected capacitive touch screen has a high requirement for the resistance of the detecting line, such that the detecting line of the projected capacitive touch screen laminated with the display panel in use needs to have not only a low electrical conductivity transparent electrode layer like ITO, but also a high electrical conductivity electrode layer like metal. Therefore, the manufacturing process is complicated, and the cost is high, especially for the large-sized and even ultra large-sized touch screens.

As iPhone and Windows 7 operating system have been launched in recent years, people are more interested in multi-point touch. Since each sensing line on a screen, no matter on a resistive touch screen or a capacitive touch screen, is directly connected to multiple sensing units, sensing units are not completely independent of each other. In order to recognize multiple touch points, compared with single-point touch, the scanning mode of detection becomes more complicated and much time is spent on detection, or the judgment procedure after detection becomes complicated and requires strong computing power and large storage space and also consumes a lot of time. By improving the touch screen directly and modifying the detection mode accordingly, the sensing units on the screen can be completely independent and multi-point touch will become easy and natural.

SUMMARY OF THE INVENTION

The present invention is directed to a touch screen having active devices, so that sensing units on the screen are completely independent.

The basic operating principle of the active touch system of the present invention is as follows.

Sensing electroding units in an array and two groups of intersecting control electrodes and detecting lines are disposed on a touch substrate, and the detecting lines are connected to sensing electrodings through active devices. The control electrodes are used to control on and off of the active devices, and the detecting lines are used to apply touch excitation signals to the sensing electrodings, and detect a leakage current of a sensing electroding to a touch object. When a human finger or other touch object approaches or contacts a sensing electroding unit, a coupling capacitance is formed between the finger or other touch object and the sensing electroding unit, and the touch excitation signal on the sensing electroding unit is leaked out partially through the coupling capacitance. The touch system circuit finds a detecting line with a maximum leakage current or a leakage current exceeding a threshold by detecting a change of a touch signal on each detecting line providing the touch excitation signal to the sensing electroding, and then determines the sensing electroding unit generating the leakage current according to the control electrode line turning on the active device at this time, so as to find a position of the finger or other touch object on the touch substrate.

A thin film field effect transistor, namely, thin film transistor (TFT), is a typical representative of active matrix devices, and in the TFT, a gate is connected to a scanning line in a horizontal direction, a source is connected to a data line in a vertical direction, and a drain is connected to a load electrode (herein, the drain and source are defined habitually, and the source level does not refer specially to the level of the source electrode, but refers to the smaller one between the levels of the source electrode and the drain electrode). The active device array arranged in an array enables each load electrode to be configured with a semiconductor switching device which can be gated by pulse, so that the load electrodes are independent of each other.

Thin film field effect transistors (TFTs) are grouped into two types: N-channel metal oxide semiconductor (NMOS) and P-channel metal oxide semiconductor (PMOS). Currently, most of TFTs employ an amorphous silicon (a-Si) process, in which a gate insulating layer is SiNx, which captures positive charge easily to form a channel in an a-Si semiconductor layer, the positive charge in SiNx is used to help attract electrons to form the channel, and thus the TFTs using the a-Si process are mostly of the NMOS type. The contents of the specification are described by taking NMOS type TFTs as a representative, and PMOS type TFTs can follow the same principle, and will not be illustrated separately.

The following technical solution is provided to solve the technical problems of the present invention.

An active touch system is provided, which includes a touch substrate and sensing lines, in which the sensing lines include sensing electrodings, control electrodes, and detecting lines, and the sensing lines are used for detecting a position of a finger of an operator or other touch object on the touch substrate; the touch substrate has active device units arranged in an array, sensing electroding units arranged in an array, and at least two groups of intersecting control electrodes and detecting lines, and each control electrode line and each detecting line are isolated by an insulating layer at an intersection thereof; and the sensing electrodings are connected to active devices, and the active devices are connected to the control electrodes and the detecting lines.

The following technical solutions are further provided to solve the technical problems of the present invention.

In a specific implementation of the present invention, the active device unit in the active device array has one or more active elements.

In a specific implementation of the present invention, the active device unit in the active device array is a two-terminal active device or a three-terminal active device.

In a specific implementation of the present invention, when the active device unit in the active device array is a two-terminal active device, the control electrode line is connected to the sensing electroding unit through a capacitor, and the sensing electroding unit is further connected to one terminal of the two-terminal active device unit; and the detecting line is connected to the other terminal of the two-terminal active device unit.

In a specific implementation of the present invention, when the active device unit in the active device array is a three-terminal active device, the control electrode line and the detecting line are respectively connected to two terminals of the three-terminal active device unit, and another terminal of the three-terminal active device unit is connected to the sensing electroding unit.

In a specific implementation of the present invention, the three-terminal active device array is a TFT array, the control electrode lines and the detecting lines are respectively connected to gates and sources of TFTs, and drains of the TFTs are connected to the sensing electroding units.

In a specific implementation of the present invention, a single layer or multiple layers of shielding electrodes are disposed on a different layer at all or a part of positions of the touch substrate having the detecting lines, and the shielding electrodes are isolated from the detecting lines and the active device array by insulators.

In a specific implementation of the present invention, a single layer or multiple layers of shielding electrodes are disposed on a different layer at positions of the touch substrate having the sensing electroding units, and the shielding electrodes are isolated from the sensing electroding array by insulating layers.

In a specific implementation of the present invention, the touch substrate is a flexible or rigid transparent substrate, and the sensing electroding units are transparent electrodes.

In a specific implementation of the present invention, the sensing electroding array is disposed on a touch surface or a non-touch surface of the touch substrate In a specific implementation of the present invention, the control electrode lines or the detecting lines have fold lines, and two adjacent linear segments of the fold line form an angle ranging from 20° to 160°

In a specific implementation of the present invention, the active touch system shares the same substrate with a flat panel display screen.

In a specific implementation of the present invention, an active touch system includes a touch substrate, sensing lines, and a touch system circuit, in which the sensing lines include sensing electrodings, control electrodes, and detecting lines, the touch system circuit has a touch excitation source, a signal detection circuit, and a control circuit, and the sensing lines and the touch system circuit are used for detecting a position of a finger of an operator or other touch object on the touch substrate; the touch substrate has active device units arranged in an array, sensing electroding units arranged in an array, and at least two groups of intersecting control electrodes and detecting lines, each control electrode line and each detecting line are isolated by an insulating layer at an intersection thereof; the sensing electrodings are connected to active devices, the active devices are connected to the control electrodes and the detecting lines, the detecting lines are connected to the touch excitation source and the signal detection circuit in the touch system circuit, and the control electrodes are connected to the control circuit in the touch system circuit; the touch system circuit controls on or off of the active device units in the active device array through the control electrodes; and when a part of the active device units are in an on state, all or a part of the detecting lines are used to provide touch signals to the sensing electroding units, and detect changes of the touch signals on the detecting lines in communication with the sensing electroding units, so as to determine a position of a touch point.

In a specific implementation of the present invention, the touch signals output by the touch system circuit to the detecting lines in communication with the sensing electroding units are alternate current (AC) signals with a frequency of not less than 10 KHz.

In a specific implementation of the present invention, the touch system circuit detects at least one of amplitude, time, phase, frequency signal, and pulse number in detecting the change of the touch signal.

In a specific implementation of the present invention, the touch system circuit detects variance of the touch signal or a variation rate of the touch signal in detecting the change of the touch signal.

In a specific implementation of the present invention, the active device units in the active device array are two-terminal active devices, row electrodes serving as the control electrodes and column electrodes serving as the detecting line are respectively connected to two terminals of each active device unit in the two-terminal active device array, the sensing electroding units are connected to terminals of the two-terminal active device units connected to row electrode lines; the control circuit in the touch system circuit applies electrical signals to a part of electrode lines in the row electrodes so as to cause active devices connected thereto to be in the on state; and the detection circuit in the touch system circuit further applies touch signals to a part or all of electrode lines in the column electrodes and detects changes of the touch signals on the electrode lines.

In a specific implementation of the present invention, the active device units in the active device array are TFTs, row electrodes serving as the control electrodes and column electrodes serving as the detecting line are respectively connected to gates and sources of the TFTs, the sensing electroding units are connected to drains of the TFTs; the control circuit in the touch system circuit applies electrical signals to a part of electrode lines in the row electrodes so as to cause TFTs connected thereto to be in the on state; and the detection circuit in the touch system circuit further applies touch signals to a part or all of electrode lines in the column electrodes and detects changes of the touch signals on the electrode lines.

In a specific implementation of the present invention, the touch system circuit positions a touched column electrode line by taking a column electrode line with a change of a touch signal reaching a touch positioning condition detected by the detection circuit as the touched column electrode line; the touch system circuit positions a touched row electrode line by taking a row electrode line with an active device caused by the control circuit to be in the on state upon detecting the column electrode line with the change of the touch signal reaching the touch positioning condition as the touched row electrode line; and a touched point on the touch substrate is a cross position between the touched row electrode line and the touched column electrode line.

In a specific implementation of the present invention, the touch positioning condition is: variance of a touch signal or a variation rate of a touch signal is maximum, or variance of a touch signal or a variation rate of a touch signal exceeds a set threshold, or variance of a touch signal or a variation rate of a touch signal is maximum and exceeds a set threshold.

In a specific implementation of the present invention, the touch system circuit determines touched positions between the column electrode lines through calculation by detecting a difference between the changes of the touch signals on the column electrode lines; and the touch system circuit determines touched positions between the row electrode lines through calculation by detecting a difference between changes of the touch signal on the same column electrode line at different time points.

In a specific implementation of the present invention, the touch system circuit applies the electrical signals to a part of electrode lines in the row electrodes so as to cause the active devices connected thereto to be in the on state by scanning; and the touch system circuit applies the touch signals to all or a part of electrode lines in the column electrodes and detects changes of the touch signals on the electrode lines by scanning or simultaneously.

In a specific implementation of the present invention, the touch signal flows in a closed loop, the touch system circuit also selects a part of electrode lines of the touch substrate as touch return-loop electrodes while selecting a part of electrodes as touch excitation electrodes; or touch return-loop electrodes are disposed on a housing of the active touch system; the touch return-loop electrodes refer to sensing lines, when touch signals are applied to touch detecting lines and changes of touch signals flowing there-through are detected, in communication with a second output end of the touch excitation source or another touch excitation source for providing return paths for the touch signals on the detecting lines; and changes of the touch signals on the detecting lines in communication with the sensing electroding units are detected, so as to determine a position of a touch point In a specific implementation of the present invention, the touch return-loop electrodes refer to a part or all of electrode lines not intersecting the touch detecting lines, or a part or all of electrode lines intersecting the touch detecting lines, or a part or all of electrode lines intersecting and not intersecting the touch detecting lines.

In a specific implementation of the present invention, the touch return-loop electrodes not intersecting the touch detecting lines are electrode lines adjacent to the touch detecting lines on one or both sides thereof.

Compared with the prior art, the present invention has the following beneficial effects.

In the present invention, active devices are introduced into a touch screen, so that sensing electroding units on the screen can respectively sense the touch of a touch object completely independently. The hardware sensing stage in the front end of the touch system is improved, the detection of the touched position is digitalized in space, so that the source of the touch signal achieves the precision up to each sensing electroding unit. According to magnitudes of signals of adjacent sensing electroding units or according to the distribution of signals in the area of sensing electroding units having touch signals, the precision of positioning a touched position can be improved so that even a fine position between adjacent sensing electroding units can be positioned.

By introducing active devices into the touch screen and improving the method of obtaining touch signals in the hardware sensing stage of the touch system, the judgment procedure after detection is greatly simplified, so that post-processing chip resources can be saved significantly, the detecting becomes quicker and more reliable, and the overall cost may be lower.

By introducing active devices into the touch screen, the sensing electroding units on the screen can operate completely independently, the judgment of multi-point touch is realized, and multi-point touch becomes easy and natural.

DETAILED DESCRIPTION OF THE INVENTION

First Embodiment

Figure 1:
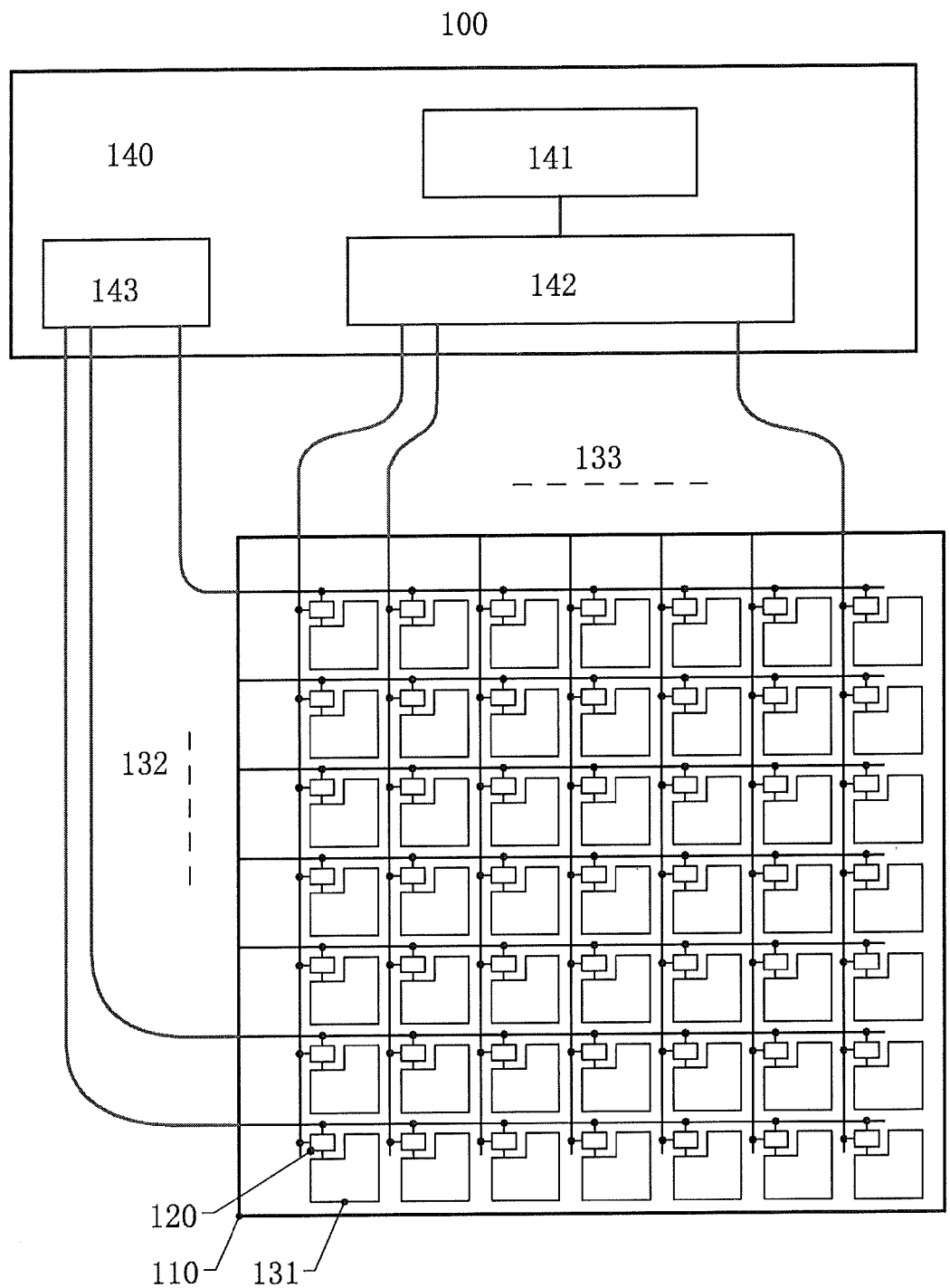
FIG. 1 is a schematic view illustrating electrical connection of a first embodiment in the present invention.

An active touch system 100 as shown in FIG. 1 includes a touch substrate 110, an active device array 120, sensing lines, and a touch system circuit 140. The three-terminal active device array 120 and the sensing line are disposed on the touch substrate 110. The sensing lines include a sensing electroding array 131 and two groups of intersecting row control electrodes 132 and column detecting lines 133. Each control electrode line and each detecting line are isolated by an insulating layer at an intersection thereof. The touch substrate 110 is a transparent substrate, each sensing electroding unit of the sensing electroding array 131 is a transparent indium tin oxide (ITO) electrode, the sensing electroding array 131, the row control electrodes 132, and the column detecting lines 133 are all disposed on a non-touch surface of the touch substrate 110 not facing users, and an insulating and protective outer layer is further disposed on the sensing electroding array 131, the row control electrodes 132, and the column detecting lines 133. The touch system circuit 140 has a touch excitation source 141, a signal detection circuit 142, and a control circuit 143.

Each control electrode line and each detecting line of the control electrodes 132 and the detecting lines 133 are respectively connected to two terminals of each active device unit of the three-terminal active device array 120; each sensing electroding unit of the sensing electroding array 131 is respectively connected to another terminal of each active device unit; the detecting lines 133 are connected to the touch excitation source 141 and the signal detection circuit 142 in the touch system circuit 140; and the control electrodes 132 are connected to the control circuit 143 in the touch system circuit 140.

The touch excitation source 141 of the touch system circuit 140 applies a touch signal to each detecting line of the detecting lines 133 simultaneously. The control circuit 143 of the touch system circuit 140 outputs a turn-on signal to each control electrode line of the control electrodes 132 row by row by scanning, active device units connected to control electrode lines with the turn-on signals are in an on state, and active device units connected to control electrode lines without the turn-on signals are in an off state. As the control circuit 143 causes active device units on each row of control electrode lines to be in the on state, the touch signals on the detecting lines flow into sensing electroding units connected to the row of control electrode lines through the active device units; the signal detection circuit 142 of the touch system circuit 140 detects a change of the touch signal on each detecting line simultaneously or column by column. In this way, as the control circuit 143 outputs the turn-on signal to each control electrode line row by row, the signal detection circuit 142 detects a change of the touch signals on the sensing electroding units connected to the row of control electrode lines through the active device units row by row.

When a finger of an operator or other touch object approaches or contacts a sensing electroding unit, a coupling capacitance is formed between the finger or other touch object and the sensing electroding unit, and the touch signal on the sensing electroding unit is leaked out partially through the coupling capacitance; the signal detection circuit 142 can find a detecting line with a maximum leakage current or with a leakage current exceeding a threshold by detecting the change of the touch signal on each detecting line applying the touch signal to the sensing electroding unit; and then according to the control electrode line turning on the active device at this time, the sensing electroding unit generating a leakage current can be determined, so as to find a position of the finger or other touch object on the touch substrate 110. Thus, the active touch system 100 becomes a touch system capable of detecting the position of a touch point.

When multiple fingers of an operator or fingers of multiple operators respectively touch multiple positions of the touch substrate 110, the signal detection circuit 142 detects that the changes of touch signals exceed a threshold on multiple detecting lines at multiple time points, that is, detects that leakage currents of multiple sensing electroding units exceed a threshold, so as to find the respective positions of the multiple fingers on the touch substrate 110. Thus, the active touch system 100 becomes a touch system capable of recognizing multiple touch points.

Second Embodiment

Figure 2:
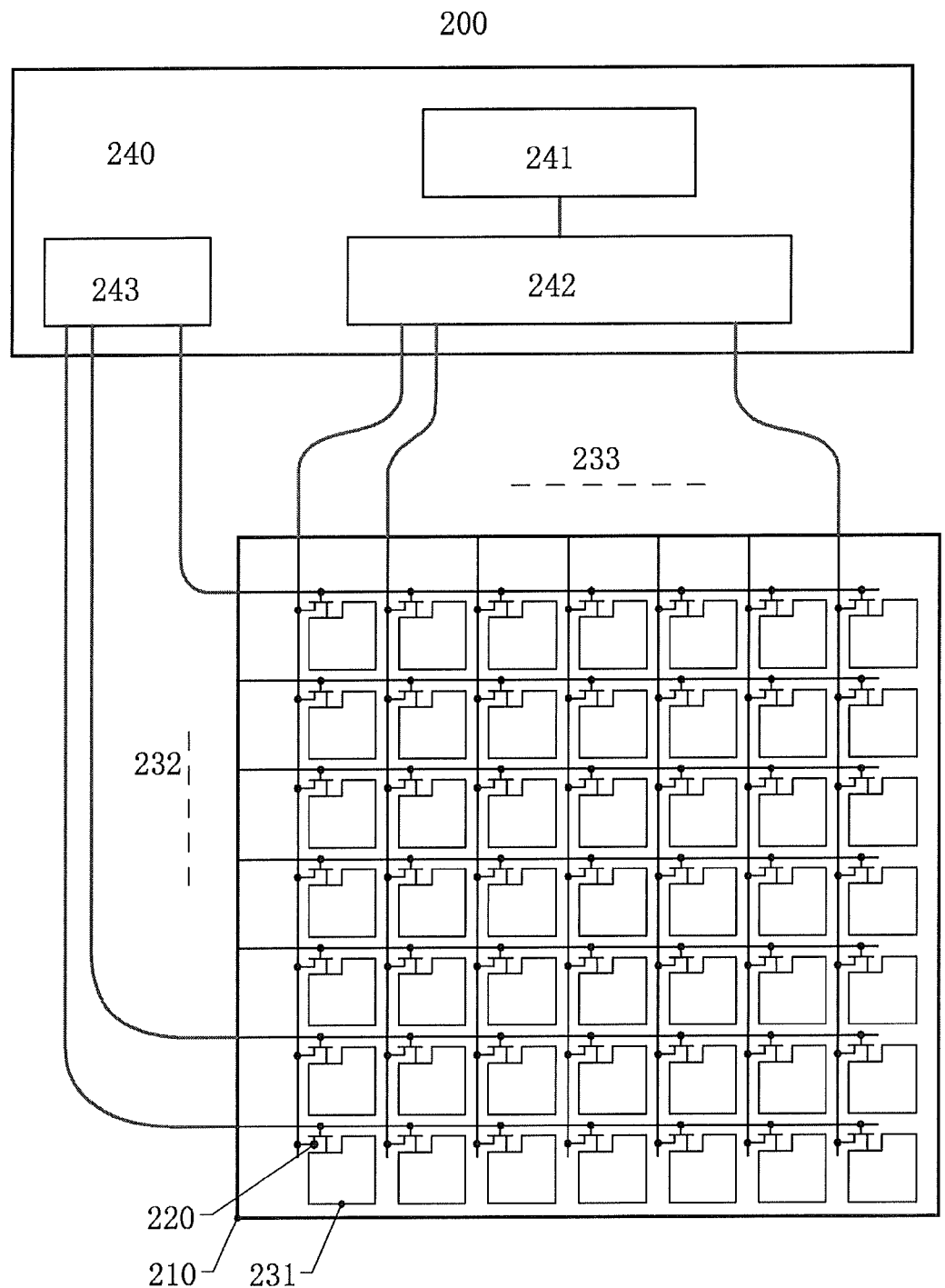
FIG. 2 is a schematic view illustrating electrical connection of a second embodiment in the present invention.

An active touch system 200 as shown in FIG. 2 includes a touch substrate 210, a thin film transistor (TFT) array 220, sensing lines, and a touch system circuit 240. The TFT array 220 and the sensing lines are disposed on the touch substrate 210. The sensing lines include a sensing electroding array 231 and two groups of intersecting row control electrodes 232 and column detecting lines 233, and each control electrode line and each detecting line are isolated by an insulating layer at an intersection thereof. The touch substrate 210 is a transparent substrate, each sensing electroding unit of the sensing electroding array 231 is a transparent ITO electrode, the sensing electroding array 231, the row control electrodes 232, and the column detecting lines 233 are all disposed on a touch surface of the touch substrate 210 facing users, and an insulating and protective outer layer is further disposed on the sensing electroding array 231, the row control electrodes 232, and the column detecting lines 233. The touch system circuit 240 has a touch excitation source 241, a signal detection circuit 242, and a control circuit 243.

Each control electrode line and each detecting line of the control electrodes 232 and the detecting lines 233 are respectively connected to a gate and a source of each TFT of the TFT array 220; each sensing electroding unit of the sensing electroding array 231 is respectively connected to a drain of each TFT; the detecting lines 233 are connected to the touch excitation source 241 and the signal detection circuit 242 in the touch system circuit 240; and the control electrodes 232 are connected to the control circuit 243 in the touch system circuit 240.

The touch excitation source 241 of the touch system circuit 240 applies a touch signal to each detecting line of the detecting lines 233 simultaneously. The control circuit 243 of the touch system circuit 240 outputs a turn-on signal to each control electrode line of the control electrodes 232 row by row by scanning, TFTs connected to control electrode lines with the turn-on signals are in an on state, and TFTs connected to control electrode lines without the turn-on signals are in an off state. As the control circuit 243 causes TFTs on each row of control electrode lines to be in the on state, the touch signals on the detecting lines flow into sensing electroding units connected to the row of control electrode lines through the TFTs; and the signal detection circuit 242 of the touch system circuit 240 detects a change of the touch signal on each detecting line simultaneously or column by column. In this way, as the control circuit 243 outputs the turn-on signal to each control electrode line row by row, the signal detection circuit 242 detects a change of touch signals on the sensing electroding units connected to the row of control electrode lines through the TFTs row by row.

When a finger of an operator or other touch object approaches or contacts a sensing electroding unit, a coupling capacitance is formed between the finger or other touch object and the sensing electroding unit, and the touch signal on the sensing electroding unit is leaked out partially through the coupling capacitance; the signal detection circuit 242 can find a detecting line with a maximum leakage current or with a leakage current exceeding a threshold by detecting the change of the touch signal on each detecting line applying the touch signal to the sensing electroding; and then according to the control electrode line turning on the TFT at this time, the sensing electroding unit generating a leakage current can be determined, so as to find a position of the finger or other touch object on the touch substrate 210. Thus, the active touch system 200 becomes a touch system capable of detecting the position of a touch point.

When multiple fingers of an operator or fingers of multiple operators respectively touch multiple positions of the touch substrate 210, the signal detection circuit 242 detects that changes of touch signals exceed a threshold on multiple detecting lines at multiple time points, that is, detects that leakage currents of multiple sensing electroding units exceeds a threshold, so as to find the respective positions of the multiple fingers on the touch substrate 210. Thus, the active touch system 200 becomes a touch system capable of recognizing multiple touch points.

Third Embodiment

Figure 3:
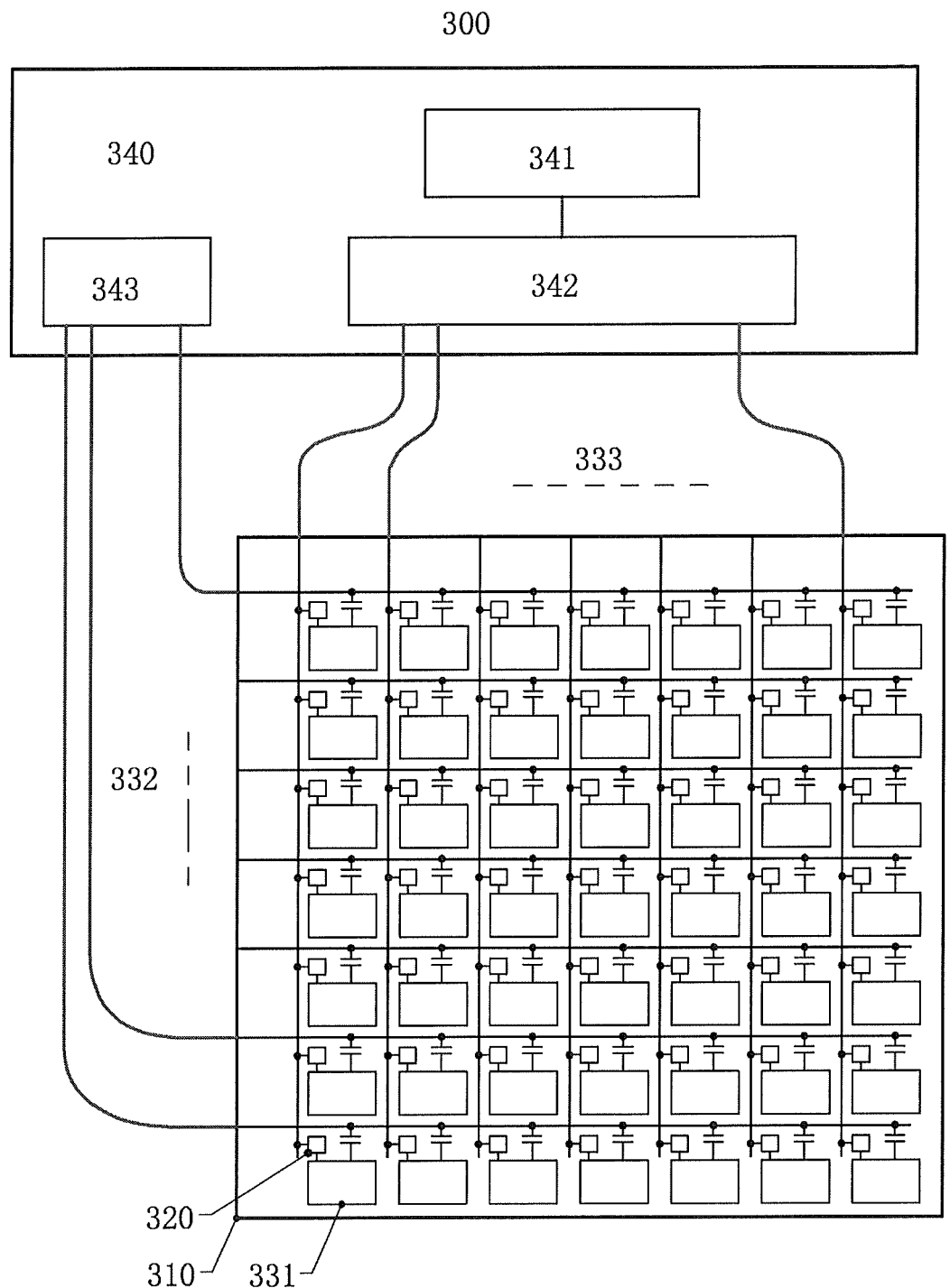
FIG. 3 is a schematic view illustrating electrical connection of a third embodiment in the present invention.

An active touch system 300 as shown in FIG. 3 includes a touch substrate 310, an active device array 320, sensing lines, and a touch system circuit 340. The two-terminal active device array 320 and the sensing lines are disposed on the touch substrate 310. The sensing lines include a sensing electroding array 331 and two groups of intersecting row control electrodes 332 and column detecting lines 333. Each control electrode line and each detecting line are isolated by an insulating layer at an intersection thereof. The touch substrate 310 is a flexible transparent substrate, each sensing electroding unit of the sensing electroding array 331 is a transparent ITO electrode, the sensing electroding array 331, the row control electrodes 332, and the column detecting lines 333 are all disposed on a non-touch surface of the touch substrate 310 not facing users. The touch system circuit 340 has a touch excitation source 341, a signal detection circuit 342, and a control circuit 343.

Each control electrode line of the control electrodes 332 is respectively connected to each sensing electroding unit of the sensing electroding array 331 through a capacitor, and each sensing electroding unit is further respectively connected to one terminal of each active device unit of the two-terminal active device array 320; each detecting line of the detecting lines 333 is respectively connected to the other terminal of each active device unit of the two-terminal active device array 320; the detecting lines 333 are connected to the touch excitation source 341 and the signal detection circuit 342 in the touch system circuit 340; and the control electrodes 332 are connected to the control circuit 343 in the touch system circuit 340.

The touch excitation source 341 of the touch system circuit 340 applies a touch signal to each detecting line of the detecting lines 333 simultaneously. The control circuit 343 of the touch system circuit 340 outputs a turn-on signal to each control electrode line of the control electrodes 332 row by row by scanning, the turn-on signals causes active device units connected to control electrode lines with the turn-on signals through the capacitors and the sensing electroding units to be in an on state, and active device units connected to control electrode lines without the turn-on signals through the capacitors and the sensing electroding units to be in an off state. As the control circuit 343 causes active device units on each row of control electrode lines to be in the on state, the touch signals on the detecting lines flow into sensing electroding units connected to the row of control electrode lines; the signal detection circuit 342 of the touch system circuit 340 detects a change of the touch signal on each detecting line simultaneously or column by column. In this way, as the control circuit 343 outputs the turn-on signal to each control electrode line row by row, the signal detection circuit 342 detects a change of the touch signals on the sensing electroding units connected to the row of control electrode lines row by row.

When a finger of an operator or other touch object approaches or contacts a sensing electroding unit, a coupling capacitance is formed between the finger or other touch object and the sensing electroding unit, and the touch signal on the sensing electroding unit is leaked out partially through the coupling capacitance; the signal detection circuit 342 can find a detecting line with a maximum leakage current or with a leakage current exceeding a threshold by detecting the change of the touch signal on each detecting line applying the touch signal to the sensing electroding unit; and then according to the control electrode line turning on the active device at this time, the sensing electroding unit generating a leakage current can be determined, so as to find a position of the finger or other touch object on the touch substrate 310. Thus, the active touch system 300 becomes a touch system capable of detecting the position of a touch point.

When multiple fingers of an operator or fingers of multiple operators respectively touch multiple positions of the touch substrate 310, the signal detection circuit 342 detects that the changes of touch signals exceed a threshold on multiple detecting lines at multiple time points, that is, detects that leakage currents of multiple sensing electroding units exceed a threshold, so as to find the respective positions of the multiple fingers on the touch substrate 310. Thus, the active touch system 300 becomes a touch system capable of recognizing multiple touch points.

Fourth Embodiment

Figure 4:
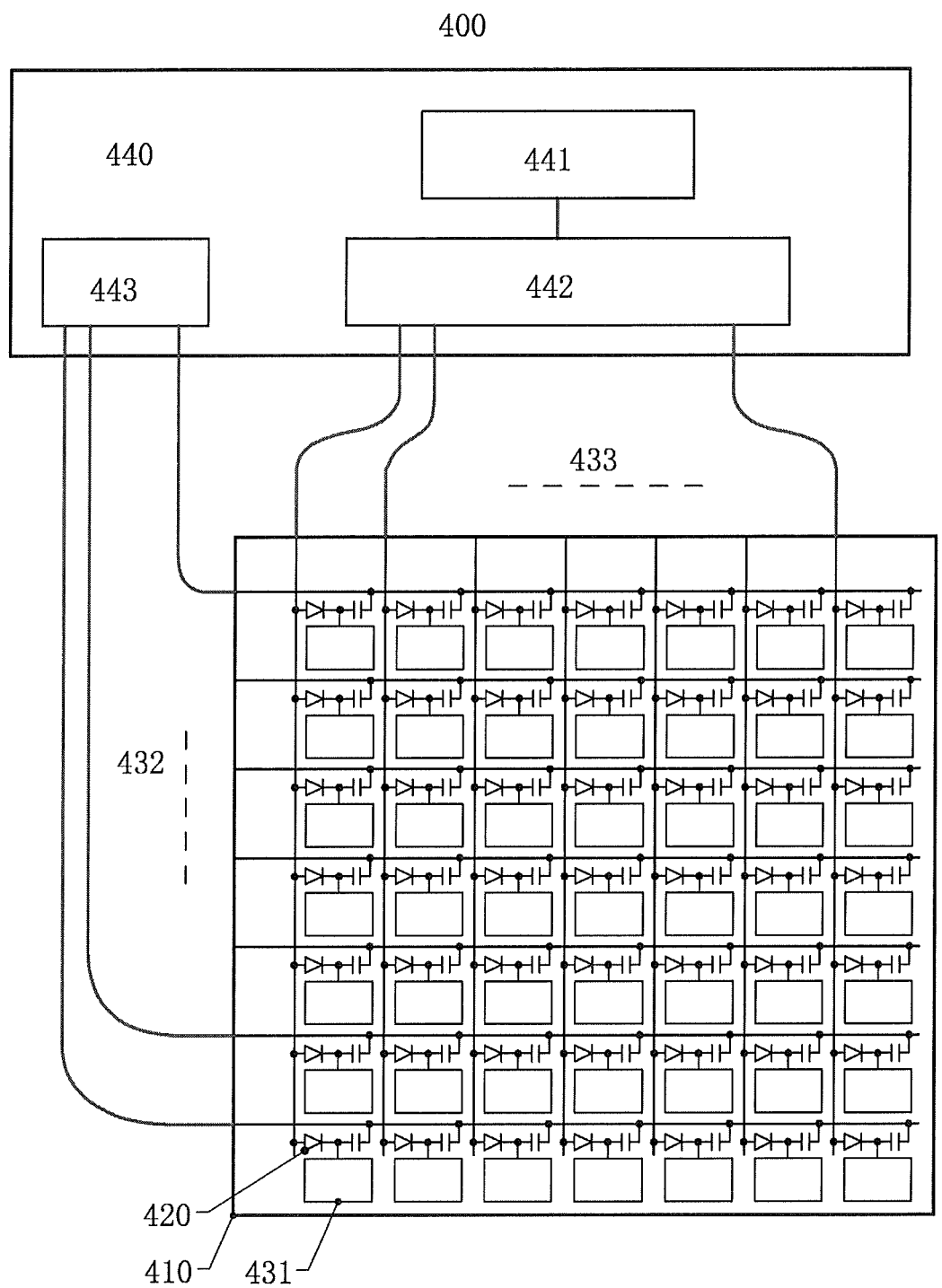
FIG. 4 is a schematic view illustrating electrical connection of a fourth embodiment in the present invention.

An active touch system 400 as shown in FIG. 4 includes a touch substrate 410, an active device array 420, sensing lines, and a touch system circuit 440. The active device unit array 420 and the sensing lines are disposed on the touch substrate 410. Each active device unit is formed by connecting a diode and a capacitor in series. The sensing lines include a sensing electroding array 431 and two groups of intersecting row control electrodes 432 and column detecting lines 433. Each control electrode line and each detecting line are isolated by an insulating layer at an intersection thereof. The touch substrate 410 is a flexible transparent substrate, each sensing electroding unit of the sensing electroding array 431 is a transparent ITO electrode, the sensing electroding array 431, the row control electrodes 432, and the column detecting lines 433 are all disposed on a non-touch surface of the touch substrate 410 not facing users. The touch system circuit 440 has a touch excitation source 441, a signal detection circuit 442, and a control circuit 443.

Each control electrode line and each detecting line of the control electrodes 432 and the detecting lines 433 are respectively connected to two terminals of each diode-capacitor series connection unit of the active device unit array 420; each sensing electroding unit of the sensing electroding array 431 is respectively connected to a connection point between each diode and capacitor; the detecting lines 433 are connected to the touch excitation source 441 and the signal detection circuit 442 in the touch system circuit 440; and the control electrodes 432 are connected to the control circuit 443 in the touch system circuit 440.

The touch excitation source 441 of the touch system circuit 440 applies a touch signal to each detecting line of the detecting lines 433 simultaneously. The control circuit 443 of the touch system circuit 440 outputs a turn-on signal to each control electrode line of the control electrodes 432 row by row by scanning, diode-capacitor series connection units connected to control electrode lines with the turn-on signals are in an on state, and diode-capacitor series connection unit units connected to control electrode lines without the turn-on signals are in an off state. As the control circuit 443 causes active device units on each row of control electrode lines to be in the on state, the touch signals on the detecting lines flow into sensing electroding units connected to the row of control electrode lines; the signal detection circuit 442 of the touch system circuit 440 detects a change of the touch signal on each detecting line simultaneously or column by column. In this way, as the control circuit 443 outputs the turn-on signal to each control electrode line row by row, the signal detection circuit 442 detects a change of the touch signals on the sensing electroding units connected to the row of control electrode lines.

When a finger of an operator or other touch object approaches or contacts a sensing electroding unit, a coupling capacitance is formed between the finger or other touch object and the sensing electroding unit, and the touch signal on the sensing electroding unit is leaked out partially through the coupling capacitance; the signal detection circuit 442 can find a detecting line with a maximum leakage current or with a leakage current exceeding a threshold by detecting the change of the touch signal on each detecting line applying the touch signal to the sensing electroding unit; and then according to the control electrode line turning on the active device unit at this time, the sensing electroding unit generating a leakage current can be determined, so as to find a position of the finger or other touch object on the touch substrate 410. Thus, the active touch system 400 becomes a touch system capable of detecting the position of a touch point.

When multiple fingers of an operator or fingers of multiple operators respectively touch multiple positions of the touch substrate 410, the signal detection circuit 442 detects that the changes of touch signals exceed a threshold on multiple detecting lines at multiple time points, that is, detects that leakages current of multiple sensing electroding units exceed a threshold, so as to find the respective positions of the multiple fingers on the touch substrate 410. Thus, the active touch system 400 becomes a touch system capable of recognizing multiple touch points.

Fifth Embodiment

Figure 5:
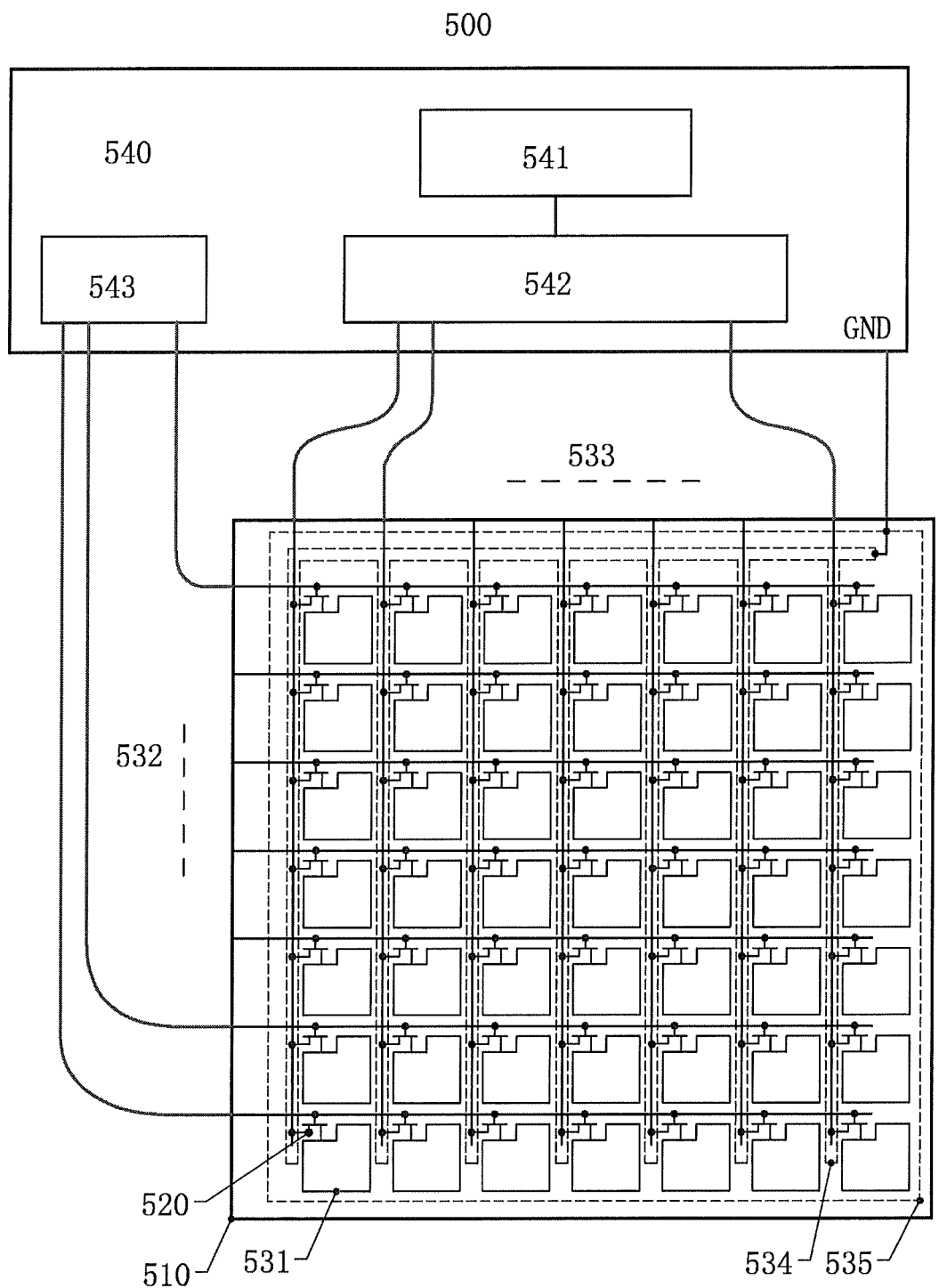
FIG. 5 is a schematic view illustrating electrical connection of a fifth embodiment in the present invention.

An active touch system 500 as shown in FIG. 5 includes a touch substrate 510, a TFT array 520, sensing lines, a touch system circuit 540, and a display screen. The TFT array 520 and the sensing lines are disposed on the touch substrate 510. The sensing lines include a sensing electroding array 531 and two groups of intersecting row control electrodes 532 and column detecting lines 533, and each control electrode line and each detecting line are isolated by an insulating layer at an intersection thereof. Linear shielding electrodes 534 are disposed on a different layer of the touch substrate 510 facing users at positions of all the column detecting lines 533 to prevent the interaction between a touch object and the detecting lines 533; planar shielding electrodes 535 are disposed on a different layer of the touch substrate 510 not facing users to prevent the influence of an electrical signal in the display screen on touch signals on the sensing electroding array 531 and the detecting lines 533; and the shielding electrodes 534 and 535 are isolated from the detecting lines 533, the control electrodes 532, and the TFT array 520 by insulating layers. The touch substrate 510 is a substrate shared with the display screen, each sensing electroding unit of the sensing electroding array 531 is a transparent ITO electrode, the sensing electroding array 531, the row control electrodes 532, and the column detecting lines 533 are all disposed on a touch surface of the touch substrate 510 facing users, and an insulating and protective outer layer is further disposed on the sensing electroding array 531, the row control electrodes 532, and the column detecting lines 533. The touch system circuit 540 has a touch excitation source 541, a signal detection circuit 542, and a control circuit 543.

Each control electrode line and each detecting line of the control electrodes 532 and the detecting lines 533 are respectively connected to a gate and a source of each TFT of the TFT array 520; each sensing electroding unit of the sensing electroding array 531 is respectively connected to a drain of each TFT; the detecting lines 533 are connected to the touch excitation source 541 and the signal detection circuit 542 in the touch system circuit 540; the control electrodes 532 are connected to the control circuit 543 in the touch system circuit 540; and the shielding electrodes 534 and 535 are in communication with each other and are connected to a ground terminal of the touch system circuit 540.

The touch excitation source 541 of the touch system circuit 540 applies a touch signal to each detecting line of the detecting lines 533 simultaneously. The control circuit 543 of the touch system circuit 540 outputs a turn-on signal to each control electrode line of the control electrodes 532 row by row by scanning, TFTs connected to control electrode lines with the turn-on signals are in an on state, and TFTs connected to control electrode lines without the turn-on signals are in an off state. As the control circuit 543 causes TFTs on each row of control electrode lines to be in the on state, the touch signals on the detecting lines flow into sensing electroding units connected to the row of control electrode lines through the TFTs; and the signal detection circuit 542 of the touch system circuit 540 detects a change of the touch signal on each detecting line simultaneously or column by column. In this way, as the control circuit 543 outputs the turn-on signal to each control electrode line row by row, the signal detection circuit 542 detects a change of touch signals on the sensing electroding units connected to the row of control electrode lines through the TFTs row by row.

When a finger of an operator or other touch object approaches or contacts a sensing electroding unit, a coupling capacitance is formed between the finger or other touch object and the sensing electroding unit, the touch signal on the sensing electroding unit is leaked out partially through the coupling capacitance; since the shielding electrodes 534 and 535 are disposed, the coupling capacitance resulting in a leakage current is not generated between the finger or other touch object and the detecting lines 533, and the electrical signal in the display does not influence the touch signals on the sensing electroding array 531 and the detecting lines 533. The signal detection circuit 542 can find a detecting line with a maximum leakage current or with a leakage current exceeding a threshold by detecting the change of the touch signal on each detecting line applying the touch signal to the sensing electroding unit; and then according to the control electrode line turning on the TFT at this time, the sensing electroding unit generating a leakage current can be determined, so as to find a position of the finger or other touch object on the touch substrate 510. Thus, the active touch system 500 becomes a touch system capable of detecting the position of a touch point.

When multiple fingers of an operator or fingers of multiple operators respectively touch multiple positions of the touch substrate 510, the signal detection circuit 542 detects that the changes of touch signals exceed a threshold on multiple detecting lines at multiple time points, that is, detects that leakage currents of multiple sensing electroding units exceed a threshold, so as to find the respective positions of the multiple fingers on the touch substrate 510. Thus, the active touch system 500 becomes a touch system capable of recognizing multiple touch points.

Sixth Embodiment

Figure 6:
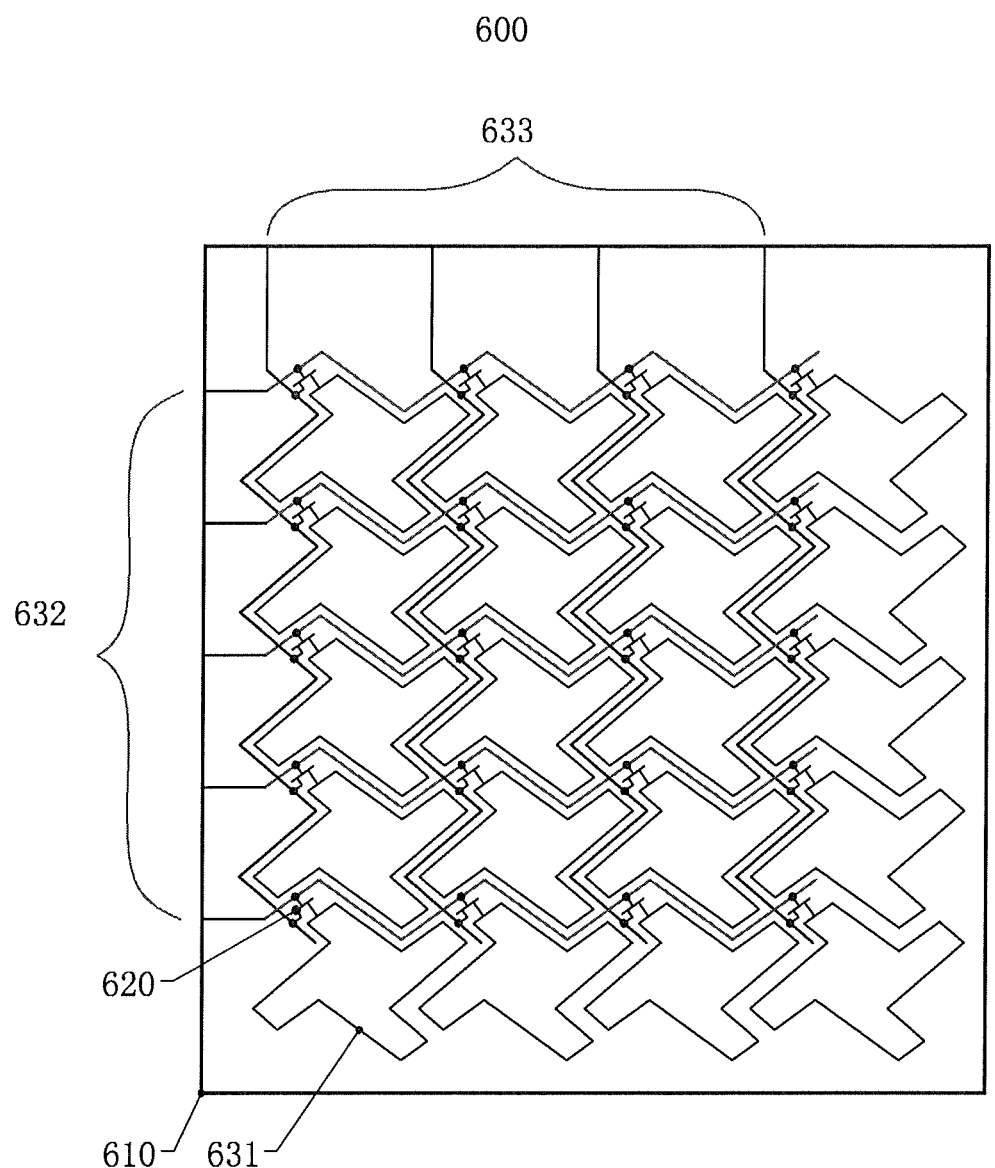
FIG. 6 is a schematic view illustrating electrical connection of a sixth embodiment in the present invention.

An active touch system 600 as shown in FIG. 6 includes a touch substrate 610, a TFT array 620, and sensing lines. The TFT array 620 and the sensing lines are disposed on the touch substrate 610. The sensing lines include a sensing electroding array 631 and two groups of intersecting row control electrodes 632 and column detecting lines 633, and each control electrode line and each detecting line are isolated by an insulating layer at an intersection thereof. The touch substrate 610 is a transparent substrate, each sensing electroding unit of the sensing electroding array 631 is a transparent ITO electrode, and the row control electrodes 632 and the column detecting lines 633 are non-transparent metal electrode lines.

In order to prevent the influence of the non-transparent row electrode lines and column electrode lines and edges of the transparent sensing electrodings on the display effect when the active touch screen 600 and the display screen are stacked in use, the row electrode lines and the column electrode lines are fold lines in an effective touch area, two adjacent linear segments of the fold line form an angle ranging from 20° to 160°, and the row electrode lines and the column electrode lines intersect without overlapping; and the shape of the edge of the transparent sensing electroding units is a polygon enclosed by two adjacent row electrode lines and two adjacent column electrode lines. The row control electrodes 632 and the column detecting lines 633 are connected through the TFT array 620 and the sensing electroding array 631 at intersections thereof. When the active touch screen 600 is used in combination with the display screen, inclined line segments in the non-transparent row electrodes 632 and the column electrodes 633 do not form diffraction fringes with non-transparent display row and column electrodes in the display screen; and edges of the fold lines of the transparent sensing electrodings 631 do not form interference fringes with transparent display pixel electrodes in the display screen, so as to avoid the influence on the display quality as much as possible.

Seventh Embodiment

Figure 7:
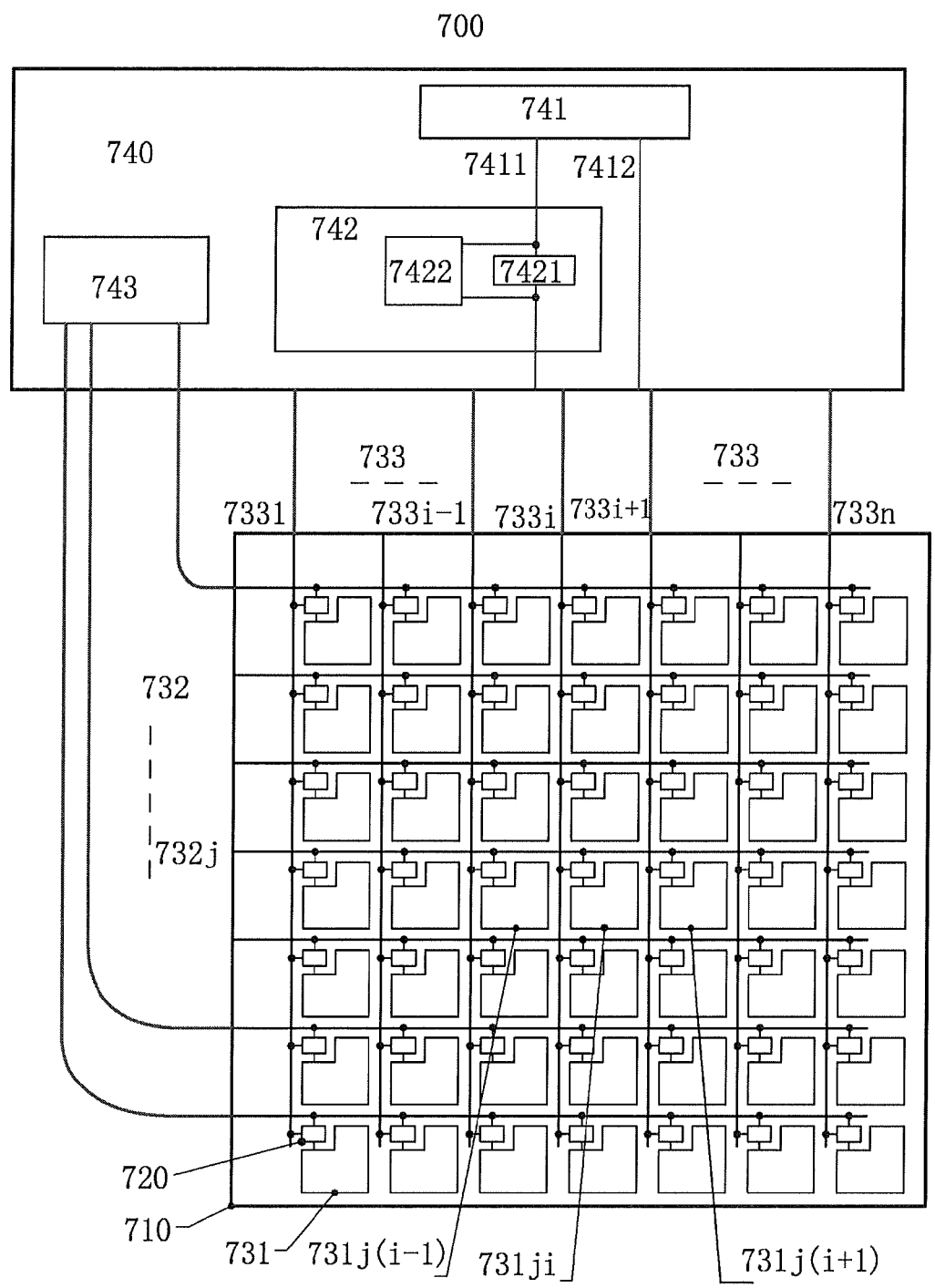
FIG. 7 is a schematic view illustrating electrical connection of a seventh embodiment in the present invention.

An active touch system 700 as shown in FIG. 7 includes a touch substrate 710, an active device array 720, sensing lines, and a touch system circuit 740. The three-terminal active device array 720 and the sensing lines are disposed on the touch substrate 710. The sensing lines include a sensing electroding array 731 and two groups of intersecting row control electrodes 732 and column detecting lines 733. Each control electrode line and each detecting line are isolated by an insulating layer at an intersection thereof. The touch substrate 710 is a transparent substrate, each sensing electroding unit of the sensing electroding array 731 is a transparent ITO electrode, the sensing electroding array 731, the row control electrodes 732, and the column detecting lines 733 are all disposed on a non-touch surface of the touch substrate 710 not facing users, and an insulating and protective outer layer is further disposed on the sensing electroding array 731, the row control electrodes 732, and the column detecting lines 733. The touch system circuit 740 has a touch excitation source 741, a signal detection circuit 742, and a control circuit 743. The touch excitation source 741 has a first output end 7411 and a second output end 7412, the signal detection circuit 742 includes a touch sampling element 7421 and a remaining circuit 7422 of the detection circuit formed by circuits such as a buffer, a differential amplifier, a data convert channel, and a data processing and timing controller.

Each control electrode line and each detecting line of the control electrodes 732 and the detecting lines 733 are respectively connected to two terminals of each active device unit of the three-terminal active device array 720; each sensing electroding unit of the sensing electroding array 731 is respectively connected to another terminal of each active device unit; an electrode line 733$i$ in the detecting lines 733 is connected to the first output end 7411 of the touch excitation source through the touch sampling element 7421, electrode lines 733$i$−1 and 733$i$+1 in the detecting lines 733 are connected to the second output end 7412 in the touch excitation source, and other electrode lines in the detecting lines 733 are also connected to the first output end 7411 of the touch excitation source, and the first output end 7411 and the second output end 7412 of the touch excitation source are output and input ports for signal return in the same touch excitation source.

The touch excitation source 741 of the touch system circuit 740 applies a touch signal to each detecting line of the detecting lines 733 simultaneously. The control circuit 743 of the touch system circuit 740 outputs a turn-on signal to each control electrode line of the control electrodes 732 row by row by scanning, active device units connected to control electrode lines with the turn-on signals are in an on state, and active device units connected to control electrode lines without the turn-on signals are in an off state. As the control circuit 743 causes active device units on each row of control electrode lines to be in the on state, the touch signals on the detecting lines flow into sensing electroding units connected to the row of control electrode lines through the active device units. A coupling capacitance $C_{i-1}$ is formed between a sensing electroding unit 731$ji$ and a sensing electroding unit 731$ji$−1, and a coupling capacitance $C_{i+1}$ is formed between the sensing electroding unit 731$ji$ and a sensing electroding unit 731$ji$+1; the touch signal forms a closed loop between the touch excitation source 741, the detecting line 733$i$, the sensing electroding unit 731$ji$, the coupling capacitance $C_{i-1}$, the sensing electroding unit 731$ji$−1, and the detecting line 733$i$−1, and also forms a closed loop between the touch excitation source 741, the detecting line 733$i$, the sensing electroding unit 731$ji$, the coupling capacitance $C_{i-1}$, the sensing electroding unit 731$ji$+1, and the detecting line 733$i$+1; the touch signal flowing out of the first output end 7411 of the touch excitation source 741 flows into the detecting line 733$i$ through the touch sampling element 7421, respectively flows into the sensing electroding unit 731$ji$−1 and the sensing electroding unit 731$ji$+1 through the coupling capacitances $C_{i-1}$ and $C_{i+1}$, and then flows back to the second output end 7412 of the touch excitation source 741 through the detecting lines 733$i$−1 and 733$i$+1, so that the touch signal flows in a closed touch loop.

When a human finger as a touch object approaches or contacts the detecting line 733$i$, since the finger has a certain width, the sensing electroding unit 731$ji$, the sensing electroding unit 731$ji$−1, and the sensing electroding unit 731$ji$ are touched at the same time. The dielectric coefficient of the human body is far greater than that of air, so that the values of the coupling capacitances $C_{i-1}$ and $C_{i+1}$ increase and the reactance thereof decreases, and the current of the touch signal on the touch loop increases accordingly. When the finger approaches or contacts positions of detecting lines other than 733*i*, 733*i*−1, and 733*i*+1, although the coupling capacitances between the detecting lines, between the sensing electroding units, and between the sensing electroding unit and the detecting line are changed, since output ends of the touch excitation source 741 in communication with the electrodes are the same output end 7411, the change of the current in the touch signal flowing through the touch sampling element 7421 is very small.

The signal detection circuit 742 can find a detecting line with a maximum current change or with a current change exceeding a threshold by detecting the change of the touch signal on each detecting line applying the touch signal to the sensing electroding unit; and then according to the control electrode line turning on the active device at this time, the touched sensing electroding unit can be determined, so as to find a position of the finger or other touch object on the touch substrate 710. Thus, the active touch system 700 becomes a touch system capable of detecting the position of a touch point.

The detecting lines may also be divided into multiple areas, and touch excitation signals may be added in different areas according to the same principle as above and detection may be performed, so as to enhance the speed of touch detection. When multiple fingers of an operator or fingers of multiple operators respectively touch multiple positions of the touch substrate 710, the signal detection circuit 742 detects that the changes of touch signals exceed a threshold on multiple detecting lines at multiple time points, that is, detects that current changes of multiple sensing electroding units exceed a threshold, so as to find the respective positions of the multiple fingers on the touch substrate 710. Thus, the active touch system 700 becomes a touch system capable of recognizing multiple touch points.

Eighth Embodiment

Figure 8:
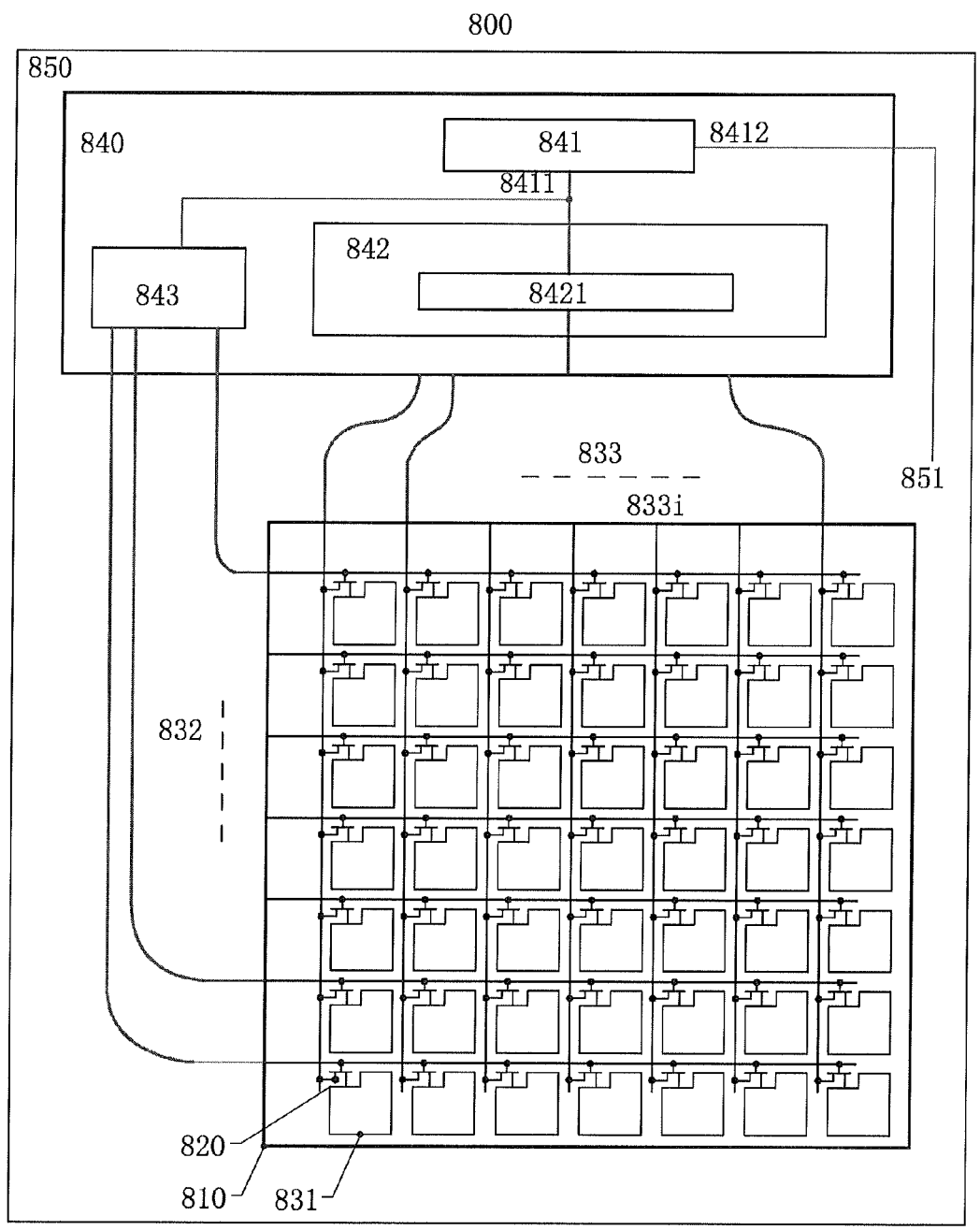
FIG. 8 is a schematic view illustrating electrical connection of an eighth embodiment in the present invention.

An active touch system 800 as shown in FIG. 8 includes a touch substrate 810, a TFT array 820, sensing lines, and a touch system circuit 840. The TFT array 820 and the sensing lines are disposed on the touch substrate 810. The sensing lines include a sensing electroding array 831 and two groups of intersecting row control electrodes 832 and column detecting lines 833. Each control electrode line and each detecting line are isolated by an insulating layer at an intersection thereof. The touch substrate 810 is a transparent substrate, each sensing electroding unit of the sensing electroding array 831 is a transparent ITO electrode, the sensing electroding array 831, the row control electrodes 832, and the column detecting lines 833 are all disposed on a touch surface of the touch substrate 810 facing users, and an insulating and protective outer layer is further disposed on the sensing electroding array 831, the row control electrodes 832, and the column detecting lines 833. The touch system circuit 840 has a touch excitation source 841, a signal detection circuit 842, and a control circuit 843. The touch excitation source 841 has a first output end 8411 and a second output end 8412 of touch signals, the signal detection circuit 842 has a touch sampling element 8421 and circuits such as a buffer, a differential amplifier, a data convert channel, and a data processing and timing controller. The active touch system has a housing 850.

Each control electrode line and each detecting line of the control electrodes 832 and the detecting lines 833 are respectively connected to a gate and a source of each TFT of the TFT array 820; each sensing electroding unit of the sensing electroding array 831 is respectively connected to a drain of each TFT; the detecting lines 833 are connected to the touch excitation source 841 and the signal detection circuit 842 in the touch system circuit 840; the control electrodes 832 are connected to the control circuit 843 in the touch system circuit 840; and an electrode 851 is disposed on the housing.

The first output end 8411 of the touch excitation source 841 of the touch system circuit 840 applies a touch signal to each detecting line of the detecting lines 833 simultaneously. The electrode 851 of the housing is connected to the second output end 8412 of the touch excitation source 841 to serve as a return-loop electrode of touch signals. The control circuit 843 of the touch system circuit 840 outputs a turn-on signal to each control electrode line of the control electrodes 832 row by row by scanning, TFTs connected to control electrode lines with the turn-on signals are in an on state, and TFTs connected to control electrode lines without the turn-on signals are in an off state. As the control circuit 843 causes TFTs on each row of control electrode lines to be in the on state, the touch signals on the detecting lines flow into sensing electroding units connected to the row of control electrode lines through the TFTs; and the signal detection circuit 842 of the touch system circuit 840 detects a change of the touch signal on each detecting line simultaneously or column by column. In this way, as the control circuit 843 outputs the turn-on signal to each control electrode line row by row, the signal detection circuit 842 detects a change of touch signals on the sensing electroding units connected to the row of control electrode lines through the TFTs row by row.

When a human finger approaches or contacts a sensing electroding unit 831*ji* connected to an electrode line 833*i* in the detecting lines 833 and an electrode line 832*j* in the control electrodes 832, a coupling capacitance $C_i$ is generated between the finger and the sensing electroding unit 831*ji*, a touch excitation signal output by the first output end 8411 of the touch excitation source 841 to the detecting line 833*i* through the touch sampling element 8421 flows into the sensing electroding unit 831*ji* through the TFT of the turn-on signal, flows into the finger through the coupling capacitance $C_i$, flows into the return-loop electrode 851 on the housing of the product through the hand holding the product, and then flows back to the second output end 8412 of the touch excitation source 841 from the return-loop electrode 851; and a touch loop is formed by the touch excitation source, the touch detecting line, the sensing electroding unit, the coupling capacitance between the finger and the sensing electroding unit, and the return-loop electrode on the housing. Alternatively, the control electrode lines without the turn-on signals can also be connected to the first output end of touch signals, so as to prevent cross flow of the touch signals in the touch system.

A detecting line with a maximum current change or a current change exceeding a threshold can be found by detecting the change of the current in the touch signal flowing through the touch sampling element 8421 simultaneously or one by one; and then according to the control electrode line turning on the active device at this time, the touched sensing electroding unit can be determined, so as to find a position of the finger or other touch object on the touch substrate 810. Thus, the active touch system 800 becomes a touch system capable of detecting the position of a touch point.

The above descriptions are merely preferred embodiments of the present invention, and are not intended to limit the scope of the invention. It is apparent to those of ordinary skill in the art that, modifications and variations can be made without departing from the spirit of the present invention, which should be covered in the protection scope of the present invention.

What is claimed is:

1. An active touch system, comprising a touch substrate and sensing electrodes, the sensing electrodes are used for detecting a position of a finger of an operator or other touch object on the touch substrate, wherein the sensing electrodes comprise on the touch substrate active device units arranged in an array, sensing electrode units arranged in an array, and at least two groups of intersecting control electrode lines and detecting electrode lines, each control electrode line and each detecting electrode line are isolated by an insulating layer at an intersection thereof; and the sensing electrode units are connected to active devices, and the active devices are connected to the control electrode lines and the detecting electrode lines, wherein the control electrode lines are used to control on and off of the active devices, and the detecting electrode lines are used to apply touch excitation signals to the sensing electrode units and detect a leakage current of a sensing electrode to a touch object, wherein a position of the finger or other touch object on the touch substrate is determined by determines the sensing electrode unit generating the leakage current.

2. The active touch system according to claim 1, wherein the active device unit in the active device array has one or more active elements.

3. The active touch system according to claim 1, wherein the active device unit in the active device array is a two-terminal active device or a three-terminal active device.

4. The active touch system according to claim 3, wherein the three-terminal active device array is a thin film transistor (TFT) array, the control electrode lines and the detecting lines are respectively connected to gates and sources of TFTs, and drains of the TFTs are connected to the sensing electroding units.

5. The active touch system according to claim 1, wherein a single layer or multiple layers of shielding electrodes are disposed on a different layer at all or a part of positions of the touch substrate having the detecting lines, and the shielding electrodes are isolated from the detecting lines and the active device array by insulators.

6. The active touch system according to claim 1, wherein the touch substrate is a flexible or rigid transparent substrate, and the sensing electroding units are transparent electrodes.

7. The active touch system according to claim 1, wherein the control electrode lines or the detecting lines have fold lines, and two adjacent linear segments of the fold line form an angle ranging from 20° to 160°.

8. An active touch system, comprising:

a touch substrate, sensing lines, and a touch system circuit, wherein the sensing lines comprise sensing electrodings, control electrodes, and detecting lines, the touch system circuit has a touch excitation source, as signal detecting circuit, and a control circuit, and the sensing lines and the touch system circuit are used for detecting a position of a finger of an operator or other touch object on the touch substrate wherein the touch substrate has active device units arranged in an array, sensing electroding units arranged in an array, and at least two groups of intersecting control electrodes and detecting lines, each control electrode line and each detecting line are isolated by an insulating layer at an intersection thereof; the sensing electrodings are connected to active devices, the active devices are connected to the control electrodes and the detecting lines, the detecting lines are connected to the touch excitation source and the signal detection circuit in the touch system circuit, the control electrodes are connected to the control circuit in the touch system circuit; the touch system circuit controls on or off of the active device units in the active device array through the control electrodes; and when a part of the active device units are in an on state, all or a part of the detecting lines are used to provide touch signals to the sensing electroding units, and detect changes of the touch signals on the detecting lines in communication with the sensing electroding units, so as to determine a position of a touch point, and the active devices in the active device array are thin film transistors (TFTs), row electrodes serving as the control electrodes and column electrodes serving as the detecting lines are respectively connected to gates and sources of the TFTs, the sensing electroding units are connected to drains of the TFTs; the control circuit in the touch system circuit applies electrical signals to a part of electrode lines in the row electrodes so as to cause TFTs connected thereto to be in the on state; and the detecting circuit in the touch system circuit further applies touch signals to a part or all of electrode lines in the column electrodes and detects changes of the touch signals on the electrode lines.

9. The active touch system according to claim 8, wherein the touch signals output by the touch system circuit to the detecting lines in communication with the sensing electroding units are alternate current signals with a frequency of not less than 10 KHz.

10. The active touch system according to claim 8, wherein the touch system circuit detects at least one of amplitude, time, phase, frequency signal, and pulse number in detecting the change of the touch signal.

11. The active touch system according to claim 8, wherein the touch system circuit detects variance of the touch signal or a variation rate of the touch signal in detecting the change of the touch signal.

12. The active touch system according to claim 8, wherein the touch system circuit positions a touched column electrode line by taking a column electrode line with a change of a touch signal reaching a touch positioning condition detected by the detecting circuit as the touched column electrode line; the touch system circuit positions a touched row electrode line by taking a row electrode line with an active device caused by the control circuit to be in the on state upon detecting the column electrode line with the change of the touch signal reaching the touch positioning condition as the touched row electrode line; and a touched point on the touch substrate is a cross position between the touched row electrode line and the touched column electrode line.

13. The active touch system according to claim 12, wherein the touch positioning condition is: variance of a touch signal or a variation rate of a touch signal exceeds a set threshold, or variance of a touch signal or a variation rate of a touch signal is maximum and exceeds a set threshold.

14. The active touch system according to claim 8, wherein the touch system circuit determines touched positions between the column electrode lines through calculation by detecting a difference between the changes of the touch signals on the column electrode lines; and the touch system circuit determines touched positions between the row electrode lines through calculation by detecting a difference between the changes of the touch signal on the same column electrode line at different time points.

15. An active touch system, comprising:

a touch substrate, sensing lines, and a touch system circuit, wherein the sensing lines comprise sensing electrodings, control electrodes, and detecting, lines, the touch system circuit has a touch excitation source, a signal detecting circuit, and a control circuit, and the sensing lines and the touch system circuit are used for detecting a position of a finger of an operator or other touch object on the touch substrate wherein the touch substrate has active device units arranged in an array, sensing electroding units arranged in an array, and at least two groups of intersecting control electrodes and detecting lines, each control electrode line and each detecting line are isolated by an insulating layer at an intersection thereof; the sensing electrodings are connected to active devices, the active devices are connected to the control electrodes and the detecting lines, the detecting lines are connected to the touch excitation source and the signal detection circuit in the touch system circuit, the control electrodes are connected to the control circuit in the touch system circuit; the touch system circuit controls on or off of the active device units in the active device array through the control electrodes; and when a part of the active device units are in an on state, all or a part of the detecting lines are used to provide touch signals to the sensing electroding units, and detect changes of the touch signals on the detecting lines in communication with the sensing electroding units, so as to determine a position of a touch point, and the touch signal flows in a closed loop, the touch system circuit also selects a part of electrode lines of the touch substrate as touch return-loop electrodes while selecting a part of electrodes as touch excitation electrodes; or touch return-loop electrodes are disposed on a housing of the active touch system; and the touch return-loop electrodes are sensing lines, when touch signals are applied to touch detecting lines and changes of touch signals flowing there-through are detected, in communication with a second output end of touch excitation source or another touch excitation source for providing return paths for the touch signals on the detecting lines.

* * * * *